United States Patent
Kronberg (10) Patent No.: US 10,179,510 B2
(45) Date of Patent: Jan. 15, 2019

(54) VEHICLE ARRANGEMENT, METHOD AND COMPUTER PROGRAM FOR CONTROLLING THE VEHICLE ARRANGEMENT

(71) Applicant: VOLVO TRUCK CORPORATION, Göteborg (SE)

(72) Inventor: Peter Kronberg, Kåma (SE)

(73) Assignee: Volvo Truck Corporation, Göteborg (SE)

( * ) Notice: Subject to any disclaimer, the term of this patent is extended or adjusted under 35 U.S.C. 154(b) by 371 days.

(21) Appl. No.: 14/648,742

(22) PCT Filed: Dec. 7, 2012

(86) PCT No.: PCT/EP2012/005062
§ 371 (c)(1),
(2) Date: Jun. 1, 2015

(87) PCT Pub. No.: WO2014/086384
PCT Pub. Date: Jun. 12, 2014

(65) Prior Publication Data
US 2015/0314684 A1    Nov. 5, 2015

(51) Int. Cl.
*B60K 37/06*    (2006.01)
*B60K 35/00*    (2006.01)
(Continued)

(52) U.S. Cl.
CPC .............. *B60K 37/06* (2013.01); *B60K 28/02* (2013.01); *B60K 28/10* (2013.01); *B60K 35/00* (2013.01);
(Continued)

(58) Field of Classification Search
CPC .. B60K 37/06; B60K 35/00; B60K 2350/901; B60K 2350/1024; B60K 28/10;
(Continued)

(56) References Cited

U.S. PATENT DOCUMENTS 5,844,500 A    12/1998 Beuk et al.
2007/0182529 A1*    8/2007 Dobler ................... B60K 28/06
340/438

(Continued)

FOREIGN PATENT DOCUMENTS

DE    102007054310    *  5/2009    ............. B60K 35/00
JP    2007069662 A    3/2007
(Continued)

OTHER PUBLICATIONS

Japanese Official Action (dated Aug. 19, 2016) (translation) for corresponding Japanese App. 2015-545673.
(Continued)

*Primary Examiner* — Hai Phan
*Assistant Examiner* — Anthony D Afrifa-Kyei
(74) *Attorney, Agent, or Firm* — WRB-IP LLP (57) ABSTRACT

A vehicle arrangement includes a display for providing an indication of a status of a first vehicle function, a first operational interface for controlling the first vehicle function, and a control unit connected to the display and the first operational interface, the control unit being adapted for selectively controlling the display for displaying the status of the first vehicle function. The vehicle arrangement further includes an arrangement for detecting an intention to control the first operational interface, and the control unit selectively controls the display for displaying the status of the first vehicle function at and for a predetermined time period following the detection of an intention to control the first operational interface.

14 Claims, 5 Drawing Sheets

(51) Int. Cl.
 *B60R 16/023* (2006.01)
 *B60K 28/02* (2006.01)
 *B60K 28/10* (2006.01)

(52) U.S. Cl.
 CPC .. *B60R 16/0231* (2013.01); *B60K 2350/1008* (2013.01); *B60K 2350/1012* (2013.01); *B60K 2350/1024* (2013.01); *B60K 2350/2013* (2013.01); *B60K 2350/901* (2013.01); *B60K 2350/967* (2013.01)

(58) Field of Classification Search
 CPC .............. B60K 28/066; B60R 16/0231; B60R 16/0236; F16H 63/42; G08B 21/06; B60Q 9/00
 USPC .......................................... 340/439, 915, 917
 See application file for complete search history.

(56) References Cited

U.S. PATENT DOCUMENTS

2010/0182140 A1* 7/2010 Kohno ................... B60K 35/00
 340/438
2010/0214238 A1* 8/2010 Christoph .............. B60K 35/00
 345/173
2010/0321170 A1* 12/2010 Cooper .................. G02B 27/01
 340/425.5
2011/0208604 A1 8/2011 Pan

FOREIGN PATENT DOCUMENTS

| JP | 2007076383 A | 3/2007 |
| JP | 20071211798 A | 5/2007 |
| JP | 2008022064 A | 1/2008 |
| JP | 2010234877 A | 10/2010 |
| JP | 2012091758 A | 5/2012 |
| JP | 2012201330 A | 10/2012 |
| JP | 2012228973 A | 11/2012 |

OTHER PUBLICATIONS

International Search Report (dated Aug. 19, 2013) for corresponding International Application PCT/EP2012/005062.
International Preliminary Report on Patentability (dated Jan. 20, 2015) for corresponding International App. PCT/EP2012/005062.

* cited by examiner

VEHICLE ARRANGEMENT, METHOD AND COMPUTER PROGRAM FOR CONTROLLING THE VEHICLE ARRANGEMENT

BACKGROUND AND SUMMARY

The present invention relates to a display-based vehicle arrangement comprising an operational interface for a vehicle function. The invention also relates to a corresponding method and computer program product for controlling a display-based vehicle arrangement.

The operation of a vehicle involves a large plurality of different tasks, including for example the more general issues relating to distance and lane keeping, awareness in general (e.g. when driving on a straight road or entering a roundabout), and more complicated traffic situations relating to safe and economic operation of the vehicle. Modern vehicles are typically equipped with a multitude of vehicle functions for driving aid, navigation, comfort and entertainment.

Driver distraction has been identified as one of the largest safety concerns in traffic safety today. The challenges posed by the ever increasing number of nomadic devices, more sophisticated navigation systems and the permanent need of professional drivers to interact with fleet management systems, means that driver distraction is an issue increasing in severity. More than 90% of accidents are today considered to be driver behavior related.

US 2011/0208604 A1 discloses a media delivery system with voice input and head-up display. The heads-up display will show a list of metadata of connected media assets and after a selection is received by the voice input device the system will play back the selected media asset. While US 2011/0208604 A1 discloses that voice controlled input does not require the driver to avert eyes from the road it still requires voice commands corresponding to each media asset.

U.S. Pat. No. 5,844,500 describes a device with a human-machine interface for use as a user control interface, particularly in an automotive environment, which temporarily makes an indication of the function of a control organ perceptible, when the user begins to actuate it, but has not yet definitively actuated it. The device with a human-machine interface helps the user to find the right control organ, or warns about dangerous control organs. Moreover, ways of finding groups of control organs and verifying the setting of groups of control organs are made possible.

In view of the above, it would be desirable to provide further improvements in relation to a safe interface for controlling different vehicle functions. Specifically it would be desirable to provide an interface that guides the driver to control vehicle functions located outside the field of view.

In view of the above-mentioned and other drawbacks of the prior art, it is desirable to provide a vehicle arrangement that assist the driver to safely control vehicle functions.

According to a first aspect of the invention a vehicle arrangement, comprising a display for providing an indication of a status of a first vehicle function, a first operational interface for controlling the first vehicle function, and a control unit connected to the display and the first operational interface, the control unit being adapted for selectively controlling the display for displaying the status of the first vehicle function, wherein the vehicle arrangement further comprises means for detecting an intention to control the first operational interface, and the control unit selectively controls the display for displaying the status of the first vehicle function at and for a predetermined time period following the detection of an intention to control the first operational interface.

In the context of this application, an operational interface shall be interpreted as any means for controlling a vehicle function. It may e.g. be a physical bottom, switch, stick (e.g. for changing gear), hand-lever (e.g. for activating turning signal or adjusting throttle), pedals (e.g. for brake, clutch or throttle, etc), turning knob (e.g. for adjusting volume), touch screen, voice control means, gesture control means (both on-screen and in space e.g. by means of video input), or any other equivalent controlling means.

Thereby, the vehicle arrangement may assist a driver or passenger in controlling the vehicle functions, as the display makes controlling of the function intuitive by displaying the intensions of the driver on the display arranged e.g. in front of the driver's operational sight direction. The driver or passenger may instantaneous obtain visual feedback from the display, enabling him/her to keep his/her eyes on the road or other active operations while controlling the vehicle function. Instead of turning the head and looking for or on the operational interface, the eyes may be kept on the road. For example, by laying the hand on the shift stick, the driver may see what gear is in use, or when picking up a ringing mobile phone the caller ID may be displayed at the display, when lifting a bucket with sand in an excavator the weight of the load may be displayed, or when rotating the cabin relative the tracks the rotation position may be displayed etc. The vehicle arrangement according to above, allows a decentralized indirect control of the display, where the operational interface is basically virtually extended to the display for allowing direct feedback for the driver or a passenger. By allowing direct feedback through displaying a vehicle function status on the display when an intention to control the vehicle function is detected, the driver may keep his eyes on the relevant operations instead of glancing at the operational interface for controlling the vehicle function. Both a current status may thereby be communicated (e.g. what the load in the bucket is, or what gear is activated) but also a change of the status (increase of volume, cabin orientation relative the tracks etc.) may be communicated in real time.

Thereby, a safer and more efficient vehicle may be provided. Further, the display may be arranged in an operational sight line. In a car or truck the driver's operational sight line normally extends from the driver and in a direction in which the car is moving or intended to move, i.e. typically forwards or backwards. However, for another vehicle, e.g. an excavator, the operational sight line may also extend from the driver in a direction in towards an active operation. For example, the sight line may extend from the driver to the bucket if the driver is performing a digging operation. Thus, the display may be arranged between the driver and the windshield, or between the driver and another window of the vehicle.

In one embodiment of the invention, the vehicle arrangement further comprises a second operational interface for controlling a second vehicle function, and means for detecting an intention to control the second operational interface, wherein the control unit is further connected to the second operational interface and adapted for selectively controlling the display for displaying the status of the first or the second vehicle function based on a priority level for the first vehicle function relative a priority level for the second vehicle function. Thereby, intentions to control several functions may be detected and the function status having the highest priority level may be displayed in real time on the display.

Thereby, the driver or passenger may simultaneously intend to control two functions and the status of the most relevant function is displayed, wherein relevancy is based on the priority level of each function. By enabling the vehicle arrangement to not only detect intensions to control vehicle functions, but also to consider the priority level of the vehicle functions statuses the vehicle arrangement may further assist the driver in focusing on performed operations, e.g. driving or digging, and the most relevant functions' statuses, e.g. gear selection or bucket load weight. The priority level may relate directly to a corresponding function or relate indirectly to the corresponding function by representing the priority level of the status of the corresponding function. E.g. the status of a bucket exceeding maximum load weight may have one priority level and the status the bucket being empty may have another priority level, or e.g. the vehicle function of the gear selection may have the same priority irrespective of what gear is selected. The priority level of a function or function status may be absolute i.e. be compared to a threshold value. However, the priority level may also be relative, i.e. the priority level of the first vehicle function may be compared to the priority level of the second vehicle function etc.

Further, in other embodiments more than two operational interfaces and vehicle functions may be implemented in the system, where some vehicle functions' status having higher priority level being displayed at the display, and other vehicle functions' status, e.g. having a lower priority being suppressed. Thereby, the driver may operate a vehicle with a plurality of vehicle functions and continuously obtain feedback based on the intention to operate the functions from the display from several relevant vehicle function statuses, and not being bothered with information about vehicle function statuses from non-relevant vehicle functions, e.g. having a lower priority than what is currently displayed.

In yet one embodiment of the present invention the control unit is adapted for, after displaying the status of the first or the second vehicle function, displaying the status of the other one of the first or second vehicle function. Thereby, the vehicle function status with the lower priority may be displayed after the vehicle function status with the higher priority level has already been displayed. Thereby, the driver is informed about the vehicle function status in a priority order, where the information is perceived as being ordered in several layers, where the most relevant information is provided in a top layer representing the vehicle function status having the highest priority level and the less relevant information is provided in a layer beneath the top layer representing information about any vehicle function status having a lower priority.

In one embodiment of the present invention the means for detecting the intention to control the operational interface is adapted to detect the intention prior to an operation of the relevant operational interface. Further the present invention may comprise one of a camera, a near field detector arranged in the vicinity of the operational interface, a touch sensitive sensor or textiles or a voice detector. Thereby, the intention to control a vehicle function may be detected before any operation of the operational interface is initiated. Thereby, the driver does not have to make any adjustments to a vehicle function for the display to display the status of the function. E.g. the active gear may be displayed when the driver moves his hand towards the gear shift stick or moves the foot towards the clutch.

In yet one embodiment of the present invention the vehicle arrangement further comprises driver state detecting means for detection of a driver state, and wherein the control unit selectively controls the display for suppressing the status of a vehicle function if the detected driver state is below a predetermined threshold value. Thereby, if the driver is in a detected state below the predetermined level, the vehicle arrangement may not bother the driver with status of a vehicle function if it is not necessary. By both considering the priority level of the vehicle function and the driver state, an accurate amount of information may be displayed at the display.

In one embodiment of the present invention, the vehicle arrangement further comprises driving context complexity level detecting means for detecting a complexity level of a driving context, and wherein the control unit controls the display for suppressing the status of a vehicle function if the detected context complexity level is above a predetermined threshold value. Thereby, if the driving context complexity level exceeds the threshold value, the driver is not disturbed by displaying the vehicle function status on the display, instead the status is suppressed to allow the driver to fully concentrate on the driving situation.

In one embodiment of the invention the display is a Head Up Display (HUD). Thereby, the display will only require a limited amount of space. Further a HUD is a cheap solution as the information may be projected directly on the windshield or on a piece of at least partly transparent material. In another embodiment of the invention the display comprises several displays. Thereby, a larger display may be enabled by utilizing smaller several displays. Further, the different displays may be arranged so that the driver experiences them as one displaying experience, allowing the driver to focus on what is happening outside the windshield. This may be achieved either may arranging the smaller displays e.g. close to each other, or distributed in an area between the driver and the windshield.

According to another aspect of the invention there is provided a method for controlling a vehicle arrangement, the vehicle arrangement comprising a display for providing an indication of a status of a first vehicle function, a first operational interface for controlling the first vehicle function, a control unit connected to the display and the first operational interface, and means for detecting an intention to control the first operational interface, the method comprising, detecting an intention to control the first operational interface, and selectively control the display for displaying the status of the first vehicle function at and for a predetermined time period following the detection of an indication to control the first operational interface.

The advantages of the method as defined above are largely analogous to the advantages of the vehicle arrangement as described above. That is, by allowing direct feedback through displaying a vehicle function status on the display when an intention to control the vehicle function is detected, the driver may keep his eyes on the relevant operations instead of glancing at the operational interface for controlling the vehicle function. Both a current status may thereby be communicated (e.g. what the load in the bucket is, or what gear is activated) but also a change of the status (increase of volume, cabin orientation relative the tracks etc.) may be communicated in real time.

Thereby, a safer and more efficient vehicle may be provided.

In one embodiment of the present invention the method further comprises detecting an intention to control a second operational interface, and selectively controlling the display for displaying the status of one of the first vehicle function and a second vehicle function based on a first vehicle function's priority relative a second vehicle function's priority. Thereby, as discussed above, intentions to control several functions may be detected and the function status which has the highest priority may be displayed in real time on the display. Thereby, the driver may operate a vehicle with a plurality of vehicle functions and continuously obtain feedback from the display based on detected intentions to control several relevant vehicle functions, and not being bothered with information about vehicle function statuses from non-relevant vehicle functions.

According to still another aspect of the invention, there is provided a computer-readable storage medium storing a program which causes a computer to execute a control method as described in any of the embodiments above.

According to a still further aspect of the invention there is provided a computer program product comprising a computer readable medium having stored thereon computer program means for controlling a vehicle arrangement, the vehicle arrangement comprising a display for providing an indication of a status of a first vehicle function, a first operational interface for controlling the first vehicle function, a control unit connected to the display and the first operational interface, and means for detecting an intention to control the first operational interface, wherein the computer program product comprises: code for detecting an intention to control the first operational interface, and code for selectively control the display for displaying the status of the first vehicle function at and for a predetermined time period following the detection of an indication to control the first operational interface.

In one embodiment, the computer program further comprises code for selectively control the display for displaying the status of one of the first vehicle function and a second vehicle function based on a first vehicle function's priority relative a second vehicle function's priority. The advantages with a computer program product or computer-readable storage medium storing a program as described above are analogous to the advantages as described above; it allows the driver to keep his/her eyes on the relevant operations instead of glancing at the operational interface when controlling a vehicle function.

The computer readable medium may be one of a removable nonvolatile random access memory, a hard disk drive, a floppy disk, a CD-ROM, a DVD-ROM, a USB memory, an SD memory card, or a similar computer readable medium known in the art (present and future). The present invention may be implemented using a combination of software and hardware elements.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

In the following, the vehicle arrangement is described to comprise a display, wherein the display is a Head-Up Display (HUD) 102. However, in other embodiments, the display is another type of display e.g. a segment display, video display, flat panel display, cathode ray tube display, light emitting diode display, electroluminescent display, electronic paper, plasma display, liquid crystal display, organic light emitting diode display, projecting display or any other type of display. Preferably, the display allows the user to also look through the windshield when watching the display, e.g. by being arranged essentially within the line of sight of the driver when looking through the windshield. This may be achieved through the placement of the display and/or through that the display is at least partly transparent. For the sake of clarity the same reference number 102 will be used for "HUD" and "display", as they are considered equivalent.

Figure 1:
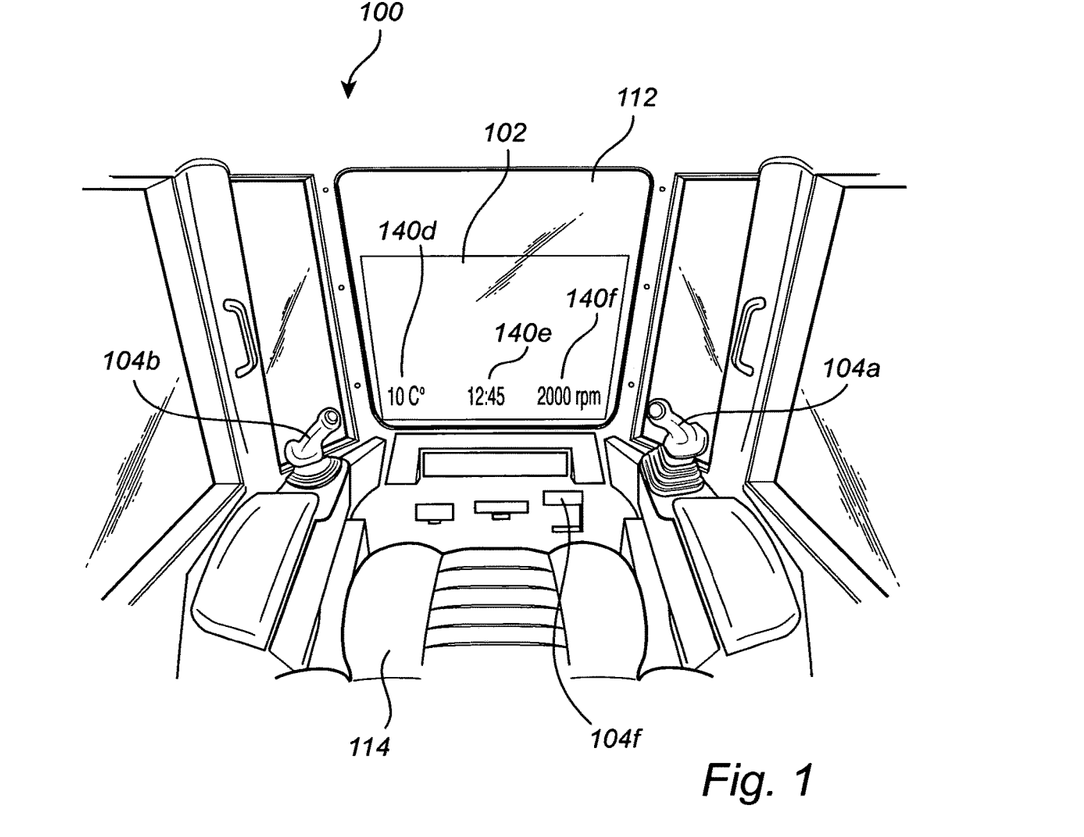
FIG. 1 is a perspective view of a vehicle cockpit with a display-based vehicle arrangement.

The vehicle arrangement as shown in FIG. 1 is arranged in a vehicle being further equipped with operational interfaces 104a, 104b, 104f for driver control of vehicle functions, and a control unit. The HUD 102 in FIG. 1 is provided for displaying information of the vehicle function(s). FIG. 1 shows a perspective view of the cockpit of an exemplary vehicle, here illustrated as a construction vehicle, e.g. an excavator, in which a display-based vehicle arrangement 100 is incorporated. The cockpit of any vehicle should preferably be designed to accommodate the driver in a driver seat 114 and enable the driver to safely and ergonomically operate the vehicle functions.

The vehicle is provided with several operational interfaces 104a, 04b, 104c arranged to enable control of vehicle functions. The operational interfaces are preferably arranged so that they are easily accessible from the driver's seat 114. Some operational interfaces may be clustered so that they are located close to each other or even located on each other. Other operational interfaces may be used for control of multiple vehicle functions, while yet other vehicle functions may be controlled simultaneously with two hands and are therefore preferably controlled by separate operational interfaces. The first 104a and a second 104b operational interface are here illustrated by joysticks. The operational interfaces are commonly designed based on the vehicle functions they are intended to control and there is a wide variety of possible operational interfaces, some are designed to operate binary states and may be embodied in a simple switch or button, while other functions have multiple modes or states and are preferably controlled by a knob, a lever or a keyboard. Further vehicle functions have stepless states and are advantageously controlled by wheels, touchpads, touchscreen or joysticks such as the already mentioned first 104a and second 104b operational interface in FIG. 1. Most operational interfaces in a vehicle are fixed or wire connected to the vehicle, but they may also be wireless such as in the case of a remote control or nomadic device. Such wireless operational interfaces may be designed specifically for the vehicle and specific vehicle functions, for example ignition keys or a remote for the suspension. Nomadic devices are most often independently designed but may for example exchange information or media streams with vehicle functions, such as in the example of a mobile phone sending phone books or audio over Bluetooth to an entertainment vehicle function. Wireless communication is obviously not limited to Bluetooth. Any currently known or future mean of wireless communication may be employed for communication between the operational interfaces and the vehicle functions in relation to the embodiment of the present invention.

Furthermore, in FIG. 1 the vehicle is provided with a HUD 102 arranged in front of the driver seat 114, such that it is in the field of view of the driver when the driver is facing forward. The HUD 102 in this embodiment comprises a display or projector, positioned in such a manner that the graphical information shown can be seen by the driver on the windshield 112. In some vehicles the windshield 112 is angled in a way making it difficult to use the windshield as the information surface for the driver, then it may be advantageous to project the information on a separate piece of glass or other transparent material in the forward field of view of the driver, the HUD may then advantageously be retractable, removable or hidden when it is not in use. The HUD 102 may be monochromatic or full color.

The display-based vehicle arrangement also comprises a control unit (not shown) hidden from plain sight. The control unit may be a separate unit but may also be a modular part, e.g. a software module, of a control unit for other vehicle functions. The control unit is connected to the operational interfaces and the HUD, this may either be a direct connection to all of the comprising parts of the display-based vehicle arrangement, but the connection may also be via an existing vehicle data bus such as a CAN network, MOST, LIN, LAN, wireless, etc. as well as any future mean of transferring data that may also be suitable. Preferably a means capable of fast communication can be employed since it may be advantageous from a usability perspective to have instantaneous visual feedback to an operational interface. The HUD 102 may further display a status 140a-140f of a vehicle function. The status may be displayed by numbers, letters and or graphical illustrations, or combinations thereof.

Further detail as to how the embodiment of a display-based vehicle arrangement 100 works in relation to the user interaction will now be described in relation to FIGS. 2-4.

FIG. 2 a-f illustrates examples of various examples of outputs on the HUD 102, each output correspond to a status of a corresponding activity performed by the driver, illustrated in FIG. 3 a-f by details of two operational interfaces 104a and 104b, also illustrated in FIG. 1. The first operational interface 104a in this embodiment is a joystick for control of the vehicle function moving the rotating upper part of the construction vehicle. The second operational interface 104b is in this embodiment of the present invention a joystick operating the hydraulic system, for example comprising the vehicle's boom, arm and bucket, i.e. the lifting and digging vehicle function. FIG. 3e also includes a nomadic device 104c as a further example of an operational interface, in this embodiment of the present invention the nomadic device is represented by a telephone.

Figure 4:
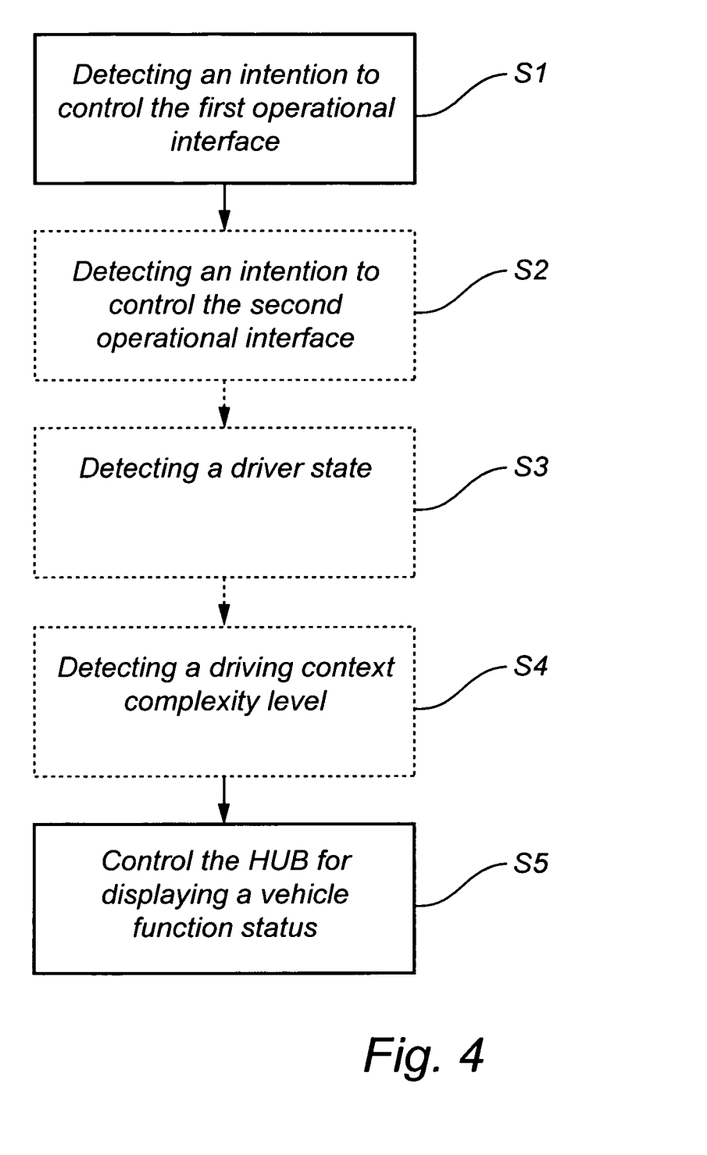
FIG. 4 illustrates a flow diagram describing one embodiment of the invention.

FIG. 4 illustrates with a flow chart the method for controlling the vehicle arrangement according to an embodiment, based on detection of a driver's intention to control operational interfaces 104a, 104b. Furthermore, it illustrates how other signals or inputs may override or change the operation.

Figure 2A:
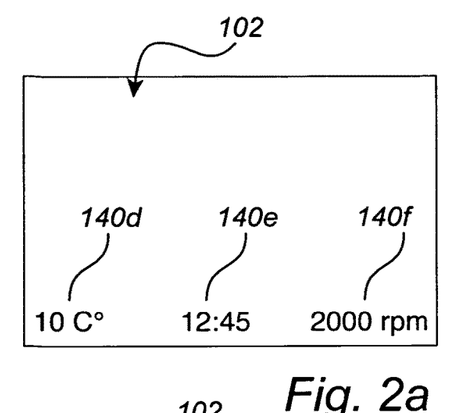
FIG. 2 is an illustration of how the output may vary in response to driver interaction.
Figure 2B:
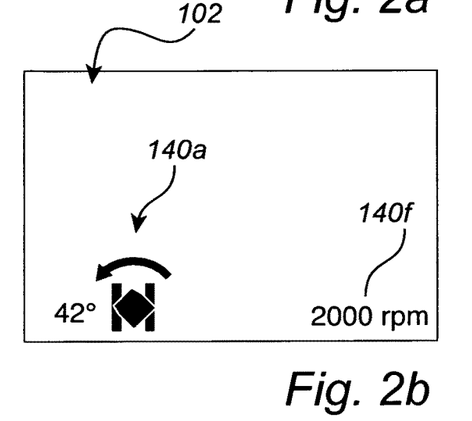
Figure 2C:
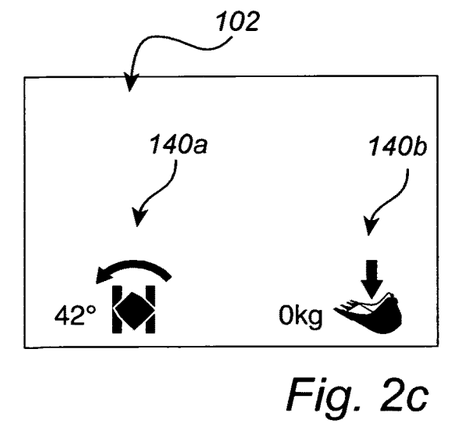
Figure 2D:
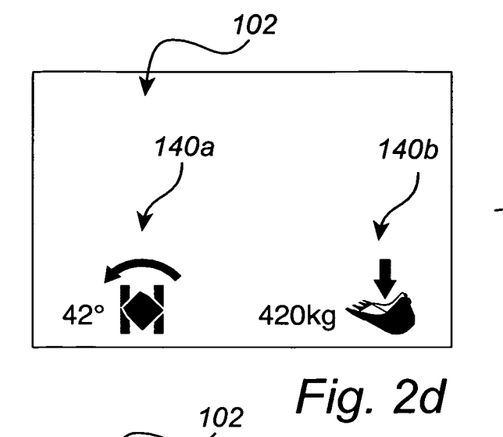
Figure 2E:
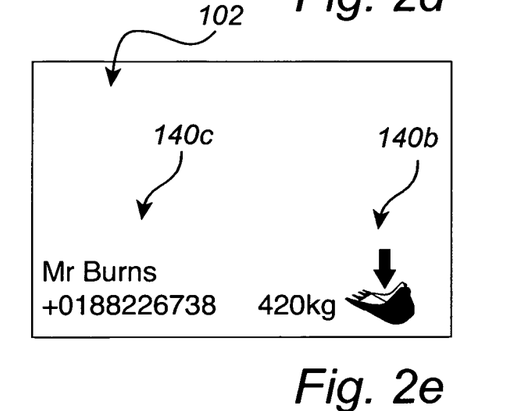
Figure 2F:
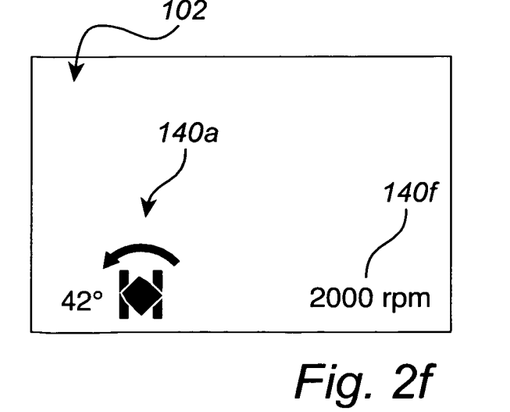
Figure 3A:
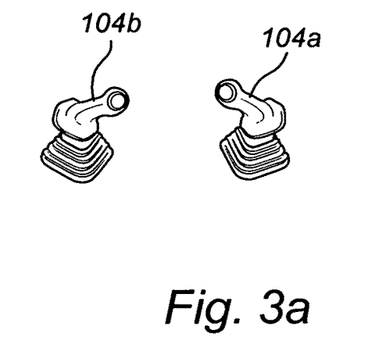
FIG. 3 illustrates driver interaction with operational interfaces.

FIG. 2-4 may advantageously be viewed together as they illustrate one example of a set of happenings occurring in chronological order, wherein the following explanation starts from the top with FIG. 2a and FIG. 3a. FIG. 3a shows a situation where no intention to control an operational interface has been detected. In FIG. 3a both operational interfaces 104a, 104b chosen to exemplify the embodiment are not being operated in any way.

Correspondingly FIG. 2a illustrates statuses of vehicle functions in the form of information that may be displayed by the HUD 102 in such a driving context. It is also possible in this driving context that no information at all is displayed in the HUD. However, in FIG. 2a, the information that is shown on the HUD 102 in this driving context is outside temperature, time and vehicle rpm In other examples other information may be displayed such as, speed, engine temperature, vehicle function warnings, gear selection, fuel consumption etc. Preferably the HUD 102 can show several sets of information at the same time. The information may be selected based on a predetermined list, for example based on vehicle states, such as ignition, running, auxiliary drive, etc. Thereby, any information or status of a vehicle function may be displayed if it has a priority level that is sufficiently high. Furthermore the driver may have previously decided or influenced the priority of the information to be shown in any particular operation mode.

Figure 3B:
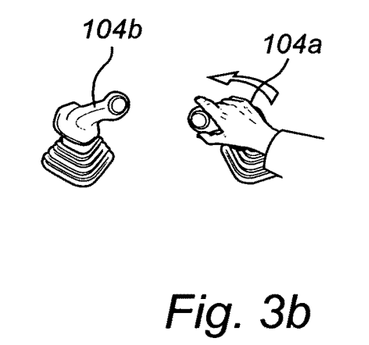

FIG. 3b illustrates how the driver is to move the first operational interface 104a with the intention to rotate the upper part of the construction vehicle. In FIG. 4, step S1, where this intention to control of the first operational interface has been detected leads to step S5 since there no detection of any intention to operate the second operational interface 104b. In the corresponding illustration FIG. 2b, it can be seen how the HUD 102 has changed some of the previously displayed vehicle function statuses/information to display information specific to the status of the vehicle function which the first operational interface 104a is controlling. It could be experienced as if the HUD 102 is acting as a mirror-link to what the driver is doing. In this embodiment of the current invention the displayed first vehicle function status 140a shown comprises a graphical symbol indicating a vehicle upper body rotating above a pair of tracks, additionally e.g. the number 42 and a degree sign, indicates that the construction vehicles top part is offset e.g. 42 degrees from the bottom part. It would also be possible to indicate this to the driver in any manner of ways that could be considered as intuitive for the driver, for example it would be possible to exchange the current angular offset of the turret, 42 degrees, with any value received from the control unit, for example the angle of the joystick, the angular rate at which the turret is turning, the angle difference to a predetermined desired angular offset, etc. Any graphical representation, such as a staple or sliding scale, instead of, or in addition to, the values may also be implemented for improving the usability experience.

Figure 3C:
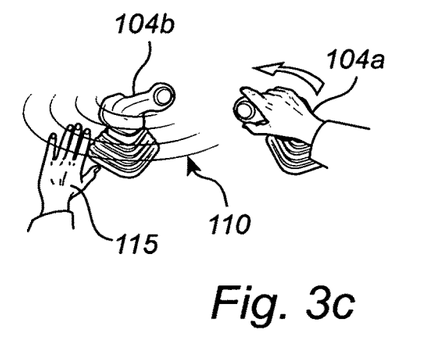

FIG. 3c illustrates a further possible scenario where the driver in a subsequent step is reaching for a second operational interface 104b, while still controlling the first operational interface 104a. In this embodiment of the present invention the operational interfaces may be provided with proximity sensors 110 that sense the movement or presence of a hand 115 in the near vicinity of the operational interface. The proximity sensors may for example be capacitive sensors that sense the touch of the operator or it could be ultrasonic sensors or infrared sensors that could sense the hand from a distance. Further possibilities include touch sensitive textiles, sensitive micro switches, etc. While in the example illustrated in FIG. 3c it may be advantageous to incorporate the sensors in the operational interface, it would also be possible to keep the proximity sensors separated from the operational interface, for example it would enable one sensor covering a larger area, e.g. even to cover user proximity to any operational interface to the vehicle.

The detection of the hand 115 in proximity to the second operational interface 104b, i.e. the joystick, triggers step S2 in FIG. 4, detecting an intention to control the second operational interface 104b. The control unit then again goes to step S5 controlling the HUD to display a new vehicle function status. FIG. 2c illustrates how a status 140b of the second vehicle function is displayed by means of a graphical symbol and a figure on the HUD 102. In this example it is a bucket, advantageously indicating to the driver that the approached second operational interface 104b controls the construction vehicle's bucket. The display-based vehicle arrangement 100 thus removes the need for the driver to avert the gaze to find the operational interface, adding safety to the currently performed vehicle function, i.e. rotating the upper part of the vehicle. Furthermore FIG. 2c shows an additional example of the kind of information that may be included with the second vehicle function's symbol, in this example 0 kg indicates that the bucket is not loaded. In a similar manner as with the values of the first vehicle function 204, the HUD may show any information beneficial for the control of the second vehicle function, such as the current position of the bucket, etc. Alternatively the symbol could be shown alone without additional information; possibly to indicate that an intention to control an operational interface has been detected but no action of a vehicle function has been initiated. The relative position any displayed vehicle function statuses in FIG. 2 should not be considered as limiting, but rather as an example in this embodiment. In some embodiments there may be predetermined relative positions indicating for example the order of the controlled vehicle functions according to FIG. 2c. In another embodiment the relative position may just as well be chosen to provide some or all vehicle functions unique positions on the HUD 102. Alternatively the driver may be able to optionally set up or adjust the layout of the HUD in any way he wants.

Figure 3D:
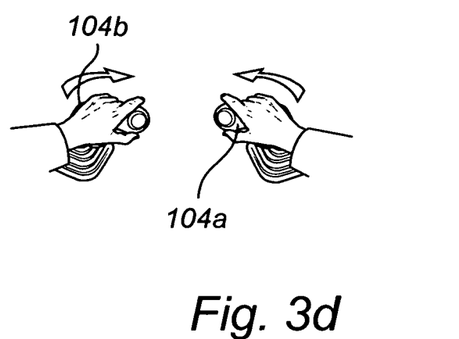

FIG. 3d illustrates how the driver has grasped the second operational interface 104b and an intention to operate a vehicle function it is detected. The second operational interface in this example operates the hydraulic or pneumatic system so that the bucket may be loaded. FIG. 2d correspondingly exemplifies how the HUD 102 could display the weight of the load, 420 kg for the driver of the vehicle.

Figure 3E:
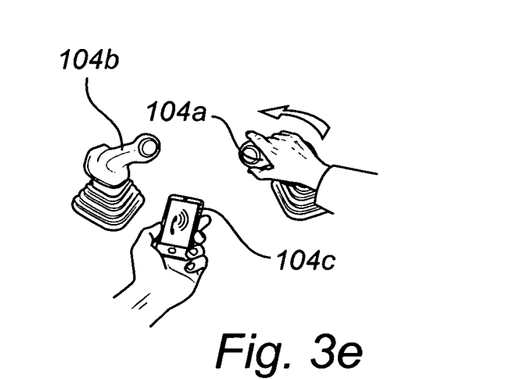

FIG. 3e illustrates primarily that the driver is engaged with the first operational interface 104a and the driver has further picked up his telephone, a nomadic device 104c, which is ringing. By picking up the nomadic device 104c, the vehicle arrangement may detect an intention to control a vehicle function related to the nomadic device. Thereby, the status of the vehicle function related to the nomadic device may be displayed on the HUD 102. The intention to control the vehicle function of the nomadic device may be detected by touching the screen or buttons, activating a voice command, using motion sensors in the phone, or performing a gesture captured for example by a video camera. The control unit thus detects an intention to control a second operational interface, i.e. the nomadic device 104c in the same manner as described above and starts to control the HUD according to the flow chart in FIG. 4. The HUD 102 in FIG. 2e has removed status of the first vehicle function 140a associated to the first operational interface 104a. This order of removing information is preferably predetermined based on a priority list among the vehicle functions. In this example the information related to the second operational interface, i.e. the bucket, had priority over the first operational interface, i.e. the rotation, and is therefore kept in the HUD 102. Furthermore the HUD is now showing information relayed from the nomadic device. A significant increase in safety may thereby be achieved by enabling the driver to operate nomadic devices without taking his eyes away from the road.

Figure 3F:
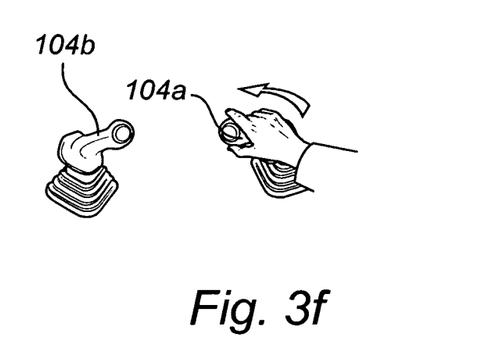

FIG. 3f depicts how the driver has released the second operational interface 104b, while still operating the first operational interface 104a. The nomadic device 104c is not present, which in this example should be interpreted as if it is no longer activated. FIG. 2f illustrates how the display-based vehicle arrangement returns to the previously displayed information relating to the vehicle function controlled by the first operational interface. In the embodiment illustrated by FIG. 2b-f the value 42 has remained unchanged for ease of understanding, the value 42 should be understood as representing any current value corresponding to the vehicle function, e.g. if the upper part of the vehicle rotates, while the HUD 102 displays information illustrated in FIG. 2e, and is offset 115 degrees when all second operational interfaces are released, then the value displayed will have changed to 115°.

An additional aspect of FIG. 2 f is that it illustrates how the symbol with the bucket 140b and the correlated information has been removed from the HUD 102 when the driver releases the second operational interface 104b as illustrated in FIG. 3f. The removal of the information from the HUD 102 may be instantaneous, but it is also possible to keep the symbol and the value for a predetermined time set equally or separately for either the value or the symbol. The predetermined time could in a similar manner be equal for all vehicle functions or be set independently for each function or group of functions that may be related.

FIG. 4 further discloses the optional step S3 wherein the method further comprises the step of detecting driver states. The means for detecting driver states may be incorporated or operatively coupled to the control unit, e.g. the detecting means may be means measuring if the driver is distracted, drowsy or otherwise impaired. Based on this information it may be possible to change the information flow on the HUD 102 based vehicle arrangement. For example it may be advantageous to suppress further information from a driver that is overloaded with information or stressed, alternatively it may be preferable to give more detailed information to a driver that is focused or possibly to visually amplify information to a distracted driver, e.g. a driver that is unaware of operational interfaces being controlled.

Furthermore FIG. 4 includes the optional step S4, detecting driving context complexity level, similarly to step S3 the control unit may have means or be operatively connected to means of determining the driving context complexity level. Such means may be assessing information sent by vehicle functions, external sensor(s) detecting obstacles, traffic information systems reporting on current traffic situation etc.

Considering for example safety reasons the control unit may advantageously suppress some information in a complex traffic situation.

Figure 5A:
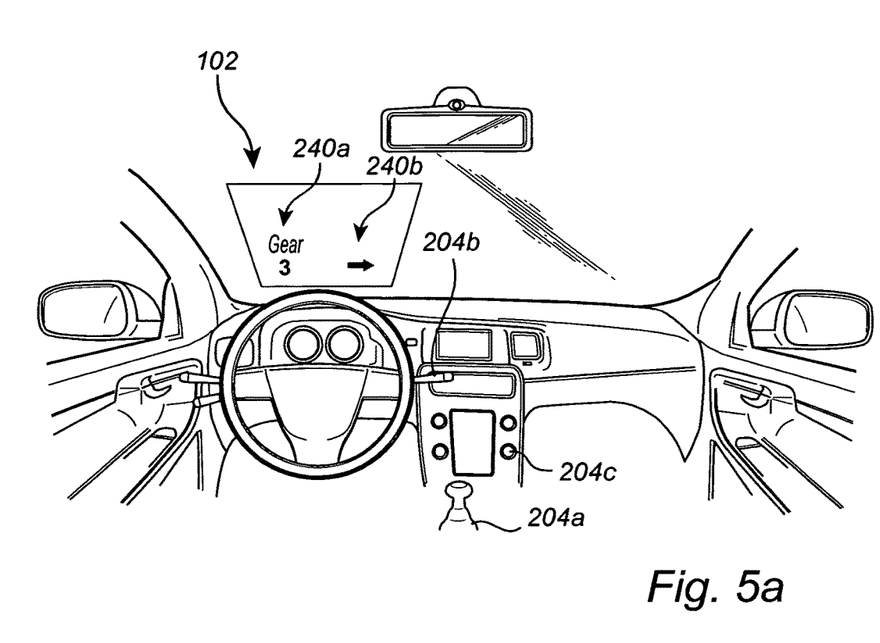
FIG. 5a is a perspective view of car cockpit.
Figure 5B:
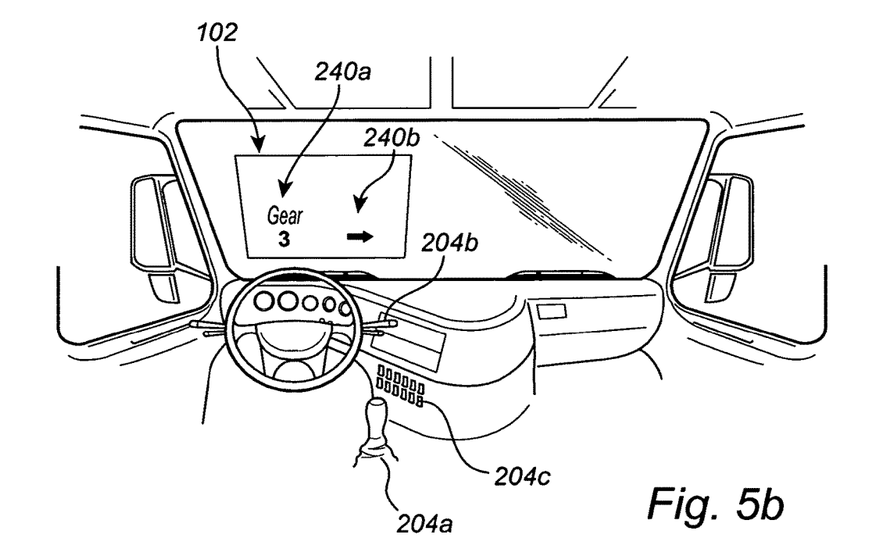
FIG. 5b is a perspective view of truck cockpit.

FIG. 5 and FIG. 5b illustrate the cockpit of a car and a truck respectively, in which further embodiments of a display-based vehicle arrangement 100 according to the present invention may be incorporated. In these two example embodiments the operational interfaces and corresponding vehicle functions may be different to the construction vehicle but the general principle of the invention remains the same. More specifically, in the examples as shown in FIGS. 5a and 5b the first operational interface 204a is a gear stick, and the status 240b of associated with the first vehicle function shows the current gear when an intention to control the gear stick is detected. Further, a second operational interface 204b is exemplified as the turning indicator lever.

Consequently, the status 240b of the second vehicle function is the turning arrow displayed at the HUD 102. Moreover, an example of further operational interfaces 204c is indicated as a button or knob respectively.

In other examples, the first and second operational interfaces may form a part of a centralized touch interface, wherein different gestures or control commands are the different operational interfaces so that they may control different vehicle functions.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium, specifically including a non-transitory computer-readable storage medium, which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The invention claimed is:

1. A vehicle arrangement, comprising
   a display for providing an indication of a status of a first vehicle function;
   a first operational interface for controlling the first vehicle function, and
   a control unit connected to the display and the first operational interface, the control unit being adapted for selectively controlling the display for displaying the status of the first vehicle function;
   means for detecting an intention to control the first operational interface, wherein the control unit selectively controls the display for displaying the status of the first vehicle function at and for a predetermined time period following the detection of an intention to control the first operational interface; and
   driving context complexity level detecting means for assessing a driving context, the driving context comprising information relating to one or more of detected obstacles, vehicle state, status of a vehicle function, and a current traffic situation and assigning the driving context a complexity level;
   wherein the control unit selectively controls the display for suppressing the status of a vehicle function if the assigned driving context complexity level is above a predetermined threshold value.

2. Vehicle arrangement according to claim 1, further comprising
   a second operational interface for controlling a second vehicle function; and
   means for detecting an intention to control the second operational interface;
   wherein the control unit is further connected to the second operational interface and adapted for selectively controlling the display for displaying the status of the first or the second vehicle function based on the first vehicle function's priority level relative the second vehicle function's priority level.

3. Vehicle arrangement according to claim 2, wherein the control unit is adapted for after displaying the status of the first or the second vehicle function displaying the status of the other one of the first or second vehicle function.

4. Vehicle arrangement according to claim 1, wherein the means for detecting the intention to control the operational interface is adapted to detect the intention prior to an operation of the relevant operational interface and comprises one of a camera, a near field detector arranged in the vicinity of the operational interface, a touch sensitive sensor or textiles or a voice detector.

5. Vehicle arrangement according to claim 1, further comprising
   driver state detecting means for detection of a driver state;
   wherein the control unit selectively controls the display for suppressing the status of a vehicle function if the detected driver state is below a predetermined threshold value.

6. Vehicle arrangement according to claim 1, wherein the display is a Head Up Display (HUD).

7. Vehicle arrangement according to claim 1, wherein the display comprises at least two display units.

8. A method for controlling a vehicle arrangement, the vehicle arrangement comprising a display for providing an indication of a status of a first vehicle function, a first operational interface for controlling the first vehicle function, a control unit connected to the display and the first operational interface, and means for detecting an intention to control the first operational interface, the method comprising:
   detecting an intention to control the first operational interface;
   selectively controlling the display for displaying the status of the first vehicle function at and for a predetermined time period following the detection of an indication to control the first operational interface;

detecting a driving complexity level; and selectively controlling, via the control unit, the display for suppressing the status of a vehicle function if the detected context complexity level is above a predetermined threshold value.

9. Method according to claim 8, further comprising:

detecting an intention to control a second operational interface, and selectively controlling the display for displaying the status of one of the first vehicle function and a second vehicle function based on a first vehicle function's priority relative a second vehicle function's priority.

10. Method according to claim 8, wherein the display is a Head Up Display (HUD).

11. A non-transitory computer-readable storage medium storing a program which causes a computer to execute a control method of claim 8.

12. A computer comprising a computer readable medium having stored thereon a computer program for controlling a vehicle arrangement, the vehicle arrangement comprising a display for providing an indication of a status of a first vehicle function, a first operational interface for controlling the first vehicle function, a control unit connected to the display and the first operational interface, and means for detecting an intention to control the first operational interface, wherein the computer program is arranged to detect an intention to control the first operational interface, is arranged to selectively control the display for displaying the status of the first vehicle function at and for a predetermined time period following the detection of an intention to control the first operational interface , is arranged to assess a driving context, the driving context comprising information relating to one or more of detected obstacles, vehicle state, status of a vehicle function, and a current traffic situation and assign the driving context a complexity level, and is arranged to selectively control the display for suppressing the status of a vehicle function if the assigned driving context complexity level is above a predetermined threshold value.

13. Computer according to claim 12, wherein the computer program is arranged to detect an intention to control a second operational interface, and is arranged to selectively control the display for displaying, the status of one of the first vehicle function and a second vehicle function based on a first vehicle function's priority relative a second vehicle function's priority.

14. Computer according to claim 12, wherein the display is a Head Up Display (HUD).

* * * * *